Patented Oct. 14, 1941

2,258,587

UNITED STATES PATENT OFFICE 2,258,587

FOAM COMPOSITION

Ernest F. Goodner, Berkeley, Calif., assignor to Standard Oil Company of California, San Francisco, Calif., a corporation of Delaware No Drawing. Application September 23, 1939, Serial No. 296,289

2 Claims. (Cl. 252—6)

This invention relates to a novel composition of matter for producing fire foam, and particularly to such a composition which, when mixed with water or an aqueous solution in the form of a powder, will produce a foam especially suitable for extinguishing and preventing the spreading of fires, particularly such fires as occur in oil storage and the like.

In the past, foams have been made by reacting aluminum sulfate and sodium bicarbonate in water and by using such substances as licorice root extract, butylnaphthalene sulfonate, oak bark extract, etc., as foam stabilizers. However, the fire foams made in accordance with such old processes have not been found satisfactory, especially for use in combating such fires as occur in oil storage where the requirements for an effective fire foam suitable for extinguishing and preventing the spreading of an oil fire are very exacting.

I have discovered that, by the use of a combination of certain surface tension reducing agents, such as the well-known wetting agents, and certain alkaline earth metal compounds containing an oxide, hydroxide or carbonate radical, particularly the calcium and magnesium oxides, hydroxides and carbonates, with such foam generating chemicals as aluminum sulfate and sodium bicarbonate, which react in water to produce a foam, an augmented and stabilized fire foam can be produced which is far superior to any now available with regard to extinguishing and the preventing of spreading of fires, especially such fires as occur in oil storage. A fire foam powder made in accordance with this invention is found to have the desirable characteristic of initiating foam production rapidly, but the duration of the reaction of the powder in producing a foam extends over a period of time long enough to produce a foam of enhanced stability. It converts a given quantity of water into a relatively large volume of foam and does so with a relatively small proportion of the powder of this invention. It is effective to produce foam over a relatively wide range of ratios of water to powder, is effective in sea water as well as in fresh water, and is relatively insensitive to the presence of some contaminating oil in the water used. Moreover, the foam produced from compositions made in accordance with this invention has a relatively long life, a relatively low drainage of water therefrom, a high resistance to being broken down when contacted by a water stream and can be built up by a high pressure, high velocity water stream when such a stream beats air into the foam body, has a high resistance to a relatively high temperature flame, good heat insulating properties, fluidity, can be spread out over a horizontal surface and will flow down over and cling to a vertical surface, can be reunited in case of a break in the foam layer, can be passed through a substantial length of a discharge line, such as a hose, without breaking down and without creating a high back pressure, and can be readily washed with water from surfaces upon which deposited.

It is accordingly one object of this invention to make a novel composition of matter capable of producing an improved fire foam having the characteristics described above.

It is another object of this invention to make a novel composition of matter in the form of a powder which, when mixed with water or an aqueous solution, will produce a foam suitable for extinguishing and preventing the spreading of fire.

It is still another object of this invention to make a novel composition of matter capable of generating a fire foam having a high stability and a high heat resistance.

Other further and important objects of this invention will be apparent to those skilled in the art to which it relates from the following description and appended claims.

In order to illustrate the best manner of preparing a fire foam powder in accordance with my invention, the following example is given of a powder made up in accordance with the following formula:

| | |
|---|---|
| Aluminum sulfate | parts by weight 57 |
| Sodium bicarbonate | parts 43 |
| "Aerosol OS" (alkyl naphthalene sulfonate) | parts 1 |
| "Marinco 50–50" | do 3 |

The aluminum sulfate and sodium bicarbonate are used in substantially stoichiometric proportions. The wetting agent, an alkyl naphthalene sulfonate sold by the American Cyanamid & Chemical Corporation under the trade-name of "Aerosol OS," in powder form may be mixed into the aluminum sulfate and sodium bicarbonate, preferably into the aluminum sulfate alone, since this appears to avoid lumping of the sodium bicarbonate, so that the wetting agent is thoroughly mixed into the powder. Should the wetting agent contain any substantial quantity of water, for example, if it be in liquid form, the water should be substantially removed before being added to prevent the premature reaction of the aluminum sulfate and sodium bicarbonate. The "Marinco 50-50" may be mixed with the components of the powder at any convenient stage.

The "Marinco 50-50" acts in this combination as an anticaker. However, not only does it function as an anticaker, but also, it cooperates or coacts with the wetting agent to stabilize the foam produced as a result of the action between the aluminum sulfate and sodium bicarbonate in water. "Marinco 50-50" is the trade-name for a product sold by the Marin Chemical Company at South San Francisco, California. This substance is in some respect similar to dolomite, but differs with respect to purity and physical and chemical characteristics. It shows considerable combined water resulting from the presence of a basic magnesium carbonate, whereas dolomite has substantially no combined water, since the magnesium present there is not in the form of its basic salt. It is thought that the chemical formula of "Marinco 50-50" is probably as follows: $Mg_4(OH)_2(CO_3)_3.3H_2O.CaCO_3$. Purity comparison shows that many substances such as silica, iron, aluminum, etc., which are normally present to a considerable extent in dolomite, are present in "Marinco 50-50" only in very small quantities. The reason for this is that "Marinco 50-50" is a synthetic product produced under rigid control from relatively pure raw materials. Its physical properties are especially distinctive. It is a soft, fluffy material having an apparent density of about 7 or 8 pounds per cubic foot, and an ultimate particle size of the order of 3 to 5 microns. Due to its physical properties it is thought that it possesses a decided advantage with respect to the rate at which any reaction in which it participates is initiated.

Other compounds, or mixtures thereof, which may be used for the purpose of this invention instead of the "Marinco 50-50", or mixed therewith, are quick lime, $CaO$; hydrated lime, $Ca(OH)_2$; dolomitic quick lime, $(CaO.MgO)$; magnesia, $MgO$; hydrated dolomitic lime, $Ca(OH)_2MgO$; calcium carbonate, particularly in the from of finely ground limestone, $CaCO_3$; magnesium carbonate, $MgCO_3$; dolomite, $MgCO_3CaCO_3$; and basic magnesium carbonate, $3MgCO_3.Mg(OH)_2.3H_2O$. Although the alkaline earth metal oxides, hydroxides and carbonates exemplified above are, in general, effective for the purpose of this invention, it is preferred that these substances be in crystalline form, finely ground and in substantially pure state. A novel and unexpected result obtained from the use of these compounds in accordance with this invention is that they act as an anticaker in the powder and, in addition to that, coact with the other constituents in stabilizing the foam produced and render it more heat resistant.

Among the wetting agents suitable for the purpose of this invention are the organic compounds whose molecules have hydrophilic heads and hydrophobic tails of such balanced effectiveness respectively that they substantially reduce the surface tension of water or an aqueous solution. These organic compounds include the organic sulfonates and sulfates, comprising the sulfonated and sulfated higher alcohols, fatty acids, and the well-known petroleum sulfonates, and include the sulfonated or sulfated octyl, lauryl, and higher alcohols, the sulfated, unsaturated fatty acids, containing from about 12 to about 18 carbon atoms per molecule, the sulfonated fatty acids in the same range and the well-known petroleum sulfonates, and the organic ether acids, such as those having the general formula R—O—R'—COOH, where R is an aliphatic, aromatic, arylaliphatic or hydroaromatic group and R' is an aliphatic group or alkylene radical. Other wetting agents suitable for the purpose of this invention will be found described in the Industrial and Engineering Chemistry, Industrial Edition, volume 31, No. 1, Consecutive No. 1, January, 1939 and in the book entitled, "Wetting and Detergency" published in 1937 by A. Harvey, London, particularly in the chapter entitled, "Wetting agents" by H. K. Dean, pages 25 to 39. Any of these compounds may be used in the form of their alkali salts as well as in the acid form. The wetting agents of this invention are effective to substantially reduce the surface tension of the aqueous solution resulting when the foam producing chemicals react, and are effective to do this whether the water used is fresh water or sea water. The value of the surface tension of the aqueous solution resulting from the reaction of approximately stoichiometrical proportions of the aluminum sulfate and sodium bicarbonate in water in a ratio of water to powder of 10/1, when reduced by the agents of this invention to a concentration of the agent of 0.2% by weight of the solution, was found to be at least 45 dynes per centimeter measured by the Du Nouy tensiometer at 20° C.

Aluminum sulfate and sodium bicarbonate have been disclosed herein as examples of chemicals which react in water to produce carbon dioxide and a gelatinous precipitate, but this invention is not limited thereto since any chemicals which generate a foam, and preferably any chemicals which produce a gas and also a gelatinous precipitate like aluminum hydroxide, upon reacting in water can be used, such as ferric sulfate and sodium carbonate, and oxalic acid and sodium bicarbonate, for examples.

Moreover, although it is preferred that the novel fire foam producing composition of my invention be made up in the form of a powder, my invention is not limited thereto since the two chemicals, such as aluminum sulfate and sodium bicarbonate, may be in the form of separate solutions, either one of which or both may contain a wetting agent while the alkaline earth metal oxides, hydroxides and carbonates may then be preferably mixed with the basic solution, that is, the solution of sodium bicarbonate, in any convenient manner.

When the fire foam generating composition of my invention is in the form of a powder, the alkaline earth compounds used have the effect of preventing caking therein when the powder is exposed to moisture. However, not only are the alkaline earth compounds of this invention excellent anticakers for the powder, but also, they coact, in a manner not completely understood, with the other components of my fire foam producing composition to make a superior fire foam which is more stable and more heat resistant than the foam obtained without these alkaline earth compounds. Although I do not wish to be limited to any theoretical explanation of the functioning of my invention, it appears that the alkaline earth compounds used in accordance with this invention, especially the carbonates, react to some extent with other components of my fire foam producing composition, perhaps with the aluminum sulfate component, forming a substance which assists in stabilizing the foam produced.

There appears to be a production or increase of tensile strength of the bubble films in the foam produced in accordance with this invention caused by the combination of wetting agent and the alkaline earth compounds used. The hydrophilic heads and hydrophobic tails of the molecules of the wetting agent used are thought to be attracted or held together because of an attraction or an interlacing of the hydrophobic tails, or by some other physical or chemical force between the tails or heads, or between each other. Moreover, the gelatinous precipitate, such as the aluminum hydroxide, the alkaline earth compounds, the possible reaction products thereof or a combination of some of these, appears to co-operate with the molecules of the wetting agent in this respect to augment the foam and to increase the stability of the foam produced. It is also thought that the resulting substances in the film layer reduce the rate of evaporation of water therefrom and, in this manner, also aid to form a relatively stable and heat resistant film structure, thus adding to the stability of the foam produced when used to extinguish and prevent the spreading of fire.

It has been found that very small proportions of the wetting agents of this invention can be used with effectiveness. The minimum proportion which is effective for any particular agent may vary with the particular agent or agents used, but in all cases the minimum proportion was found to fall within the range of 0.1 to 0.8% by weight of the mixture of carbon dioxide and gelatinous precipitate producing chemicals, such as aluminum sulfate and sodium bicarbonate, and the wetting agent. The actual minimum percentage which is effective for any particular agent or agents can be readily ascertained by a simple preliminary test. It has also been found that proportions of the agent of this invention as high as about 7% can be used to advantage for the purpose of this invention; however, the preferred optimum range lies between 1 and 2½ per cent.

In general, it is preferred to use about 3% by weight of the alkaline earth compound, but proportions as low as about 0.5% and as high as 10% may be used. The actual proportion used may vary with the particular alkaline earth compound, with the particular wetting agent and with the particular foam generating chemicals used.

When the foam powder of this invention is mixed with water to form foam, it is preferred to use a ratio of water to powder in the range from 15/1 to 10/1 by weight. However, it has been found to be a significant feature of this invention that good foam can be produced over a wide range of the ratio of water to powder by weight, for instance, from about 18/1 to about 6/1. The greater the proportion of water used the more fluid is the foam and, in general, the greater the drainage of water therefrom on standing, and lowering the proportion of water tends to reduce the fluidity of the foam and decrease the water drainage.

In using the foam powders made in accordance with this invention, it was found that when these powders are injected into a water stream the initial foam formation is sufficiently rapid to provide a relatively large quantity of foam in a very short period of time. When the foam powders are injected into a 2½" pipe carrying a stream of water at the rate of 7 gallons per minute, conversion to a satisfactory foam will be produced in the flowing stream at a distance as short as 12 feet from the point of injection. This rapid initiation of the production of foam from the powders made in accordance with this invention appears to be due to some kind of interaction between the foam stabilizing agents and the foam producing chemicals as the powder is introduced into the water. It is not known just what this interaction is, but it appears that the initial foam production is rapid even though the wetting agents themselves are slow to dissolve in water alone and the alkaline earth compounds are relatively insoluble. It is thought that the agitation resulting from the production of carbon dioxide may aid the agents in being effective for the purpose of this invention, even though the agents are very slow to dissolve in water alone.

The foam powders of this invention work in fresh water and in sea water, and in either fresh water or sea water the volume of foam produced is relatively large. The volume of foam produced in sample tests in which 10 grams of powder containing 1–2½% by weight of the wetting agent and about 3% of the alkaline earth compound was mixed into 150 c. c. of sea water at room temperature in a 1000 c. c. tapered graduate (about 10½ inches high, 5 inches top inside diameter and 1½ inches bottom inside diameter) was from 700–900 c. c. After allowing such foams to stand for about 30 seconds and then stirring somewhat vigorously (about 60 times in one minute) by hand with a wooden rod about ½" in diameter for about one minute, there was substantially no water drainage.

It was found that the effectiveness of the foam powder of this invention was not substantially detrimentally affected, except for a slight diminution in volume of foam produced, by crude oil in the water in proportion by volume of about 2 per cent.

The foam formed in accordance with this invention retains its fire resistant and fire extinguishing qualities for a relatively long period of time. This is especially important for such a foam is likely to endure for the whole time of a fire and, since it does not break down rapidly, less foam is required to replace any that has broken down. Tests showed that after standing for three hours on the ground in the open air, although the volume had decreased somewhat the foam had not deteriorated appreciably in other fire extinguishing characteristics, especially with regard to resistance to high temperature flame. After five hours some of the foams were further decreased in volume but could be revived by beating air and water into them by means of a high pressure hose stream. Upon standing for a day or two the foam was considerably shrunken and dried out but it would still float upon gasoline and could be partially revived with a high pressure hose stream.

It is an important feature of this invention that when the foams produced from the powders of this invention are placed on the ground or on the surface of oil and contacted with a high velocity, high pressure water stream, they do not break down but actually build up when the water stream beats air into the foam body. The resulting foam may be wetter and more fluid but still retains its fire extinguishing characteristics, especially for extinguishing an oil fire.

The foams were tested for fire resistant properties in the following manner: A small quantity, about 5 c. c., of paint thinner (a heavy gasoline) was placed in the bottom of a 400 c. c. evaporating dish. The dish was then filled with foam above the paint thinner and placed upon a clay triangle supported by a ring stand. A large flame of a Fisher burner was directed straight down onto the middle of the foam surface, the lower edge of the burner being about 2½ inches above the foam surface. The time required for the flame to ignite the paint thinner under the foam is a measure of the fire resistance of the foam. This value varied from about 12 to 22 minutes, depending on the agent selected and the ratio of water to powder. In general, an increase of the proportion of water with respect to the powder within the preferable range of 10 to 15 tends to increase the fire resistance of the foam.

The foams, when used to extinguish a large test oil fire, were found to flow over the oil surface and other surfaces, effectively blanketing and starving the fire. They flow down and cling to vertical surfaces and spread thereover to form a blanket. When a layer of foam upon gasoline was intentionally parted and the exposed gasoline ignited, the foam around the break flowed together to reunite the foam layer and extinguish the gasoline fire. When the foam powders are injected into a 2½" discharge hose carrying a stream of water at the rate of 85 gallons per minute, the foams produced can be transmitted through 350 feet in length of such a hose without breaking down and without developing a back pressure high enough to interfere with a satisfactory feed of powder into the water line.

Although I have, for the purpose of illustrating and explaining my invention, disclosed specific carbon dioxide and gelatinous precipitate producing chemicals and a large number of specific organic compounds effective as foam augmenting and stabilizing agents, specific proportions of the agent in the powder and specific ratio ranges of water to powder, numerous specific characteristics of the foam powder of this invention and of the foam produced therefrom, my invention is not limited thereby, but comprehends variations and modifications within the scope of the appended claims.

I claim:

1. A fire foam producing powder comprising aluminum sulfate, sodium bicarbonate, a small proportion of an alkyl naphthalene sulfonate effective to substantially reduce the surface tension of water, and a calcium-magnesium compound having the probable formula

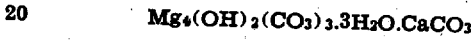

$$Mg_4(OH)_2(CO_3)_3 \cdot 3H_2O \cdot CaCO_3$$

substantially pure and in the form of a soft, fluffy material having an apparent density of 7 to 8 pounds per cubic foot and an ultimate particle size of 3 to 5 microns.

2. A fire foam producing powder comprising a mixture of substances which react in water to produce a gas and a gelatinous precipitate, a foam stabilizing agent and an anticaker comprising a calcium-magnesium compound containing radicals selected from the group consisting of oxides, hydroxides and carbonates.

ERNEST F. GOODNER.